Figure 1:
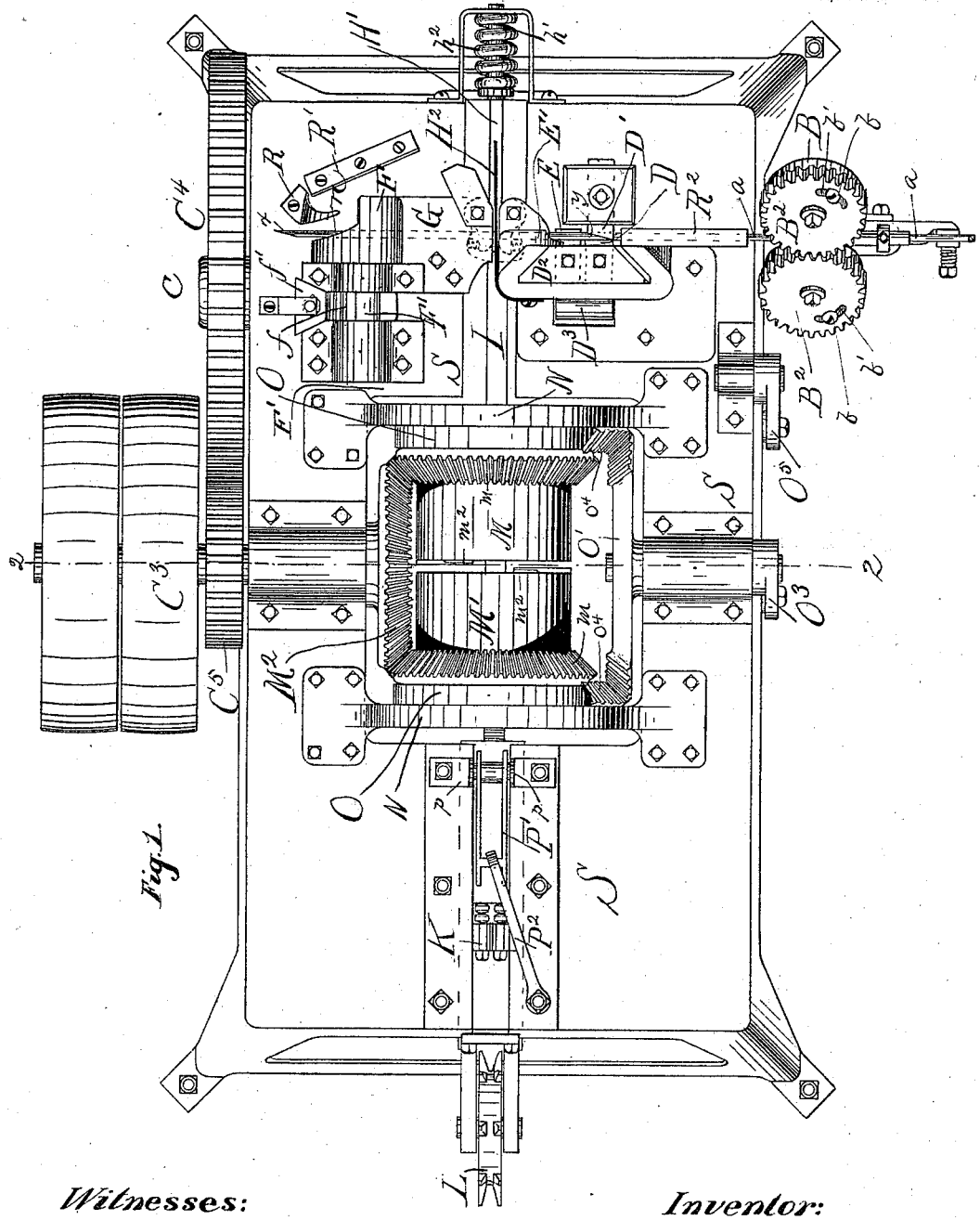

(Model.)

5 Sheets—Sheet 1.

F. P. CADY.
MACHINE FOR MAKING BARB LINK FENCING.

No. 292,408. Patented Jan. 22, 1884.

Witnesses:
J. Everett Brown
H. W. Munday.

Inventor:
Frank P. Cady
per Munday, Everts & Adcock
his Attorneys.

(Model.)
F. P. CADY.
MACHINE FOR MAKING BARB LINK FENCING.
No. 292,408. Patented Jan. 22, 1884.
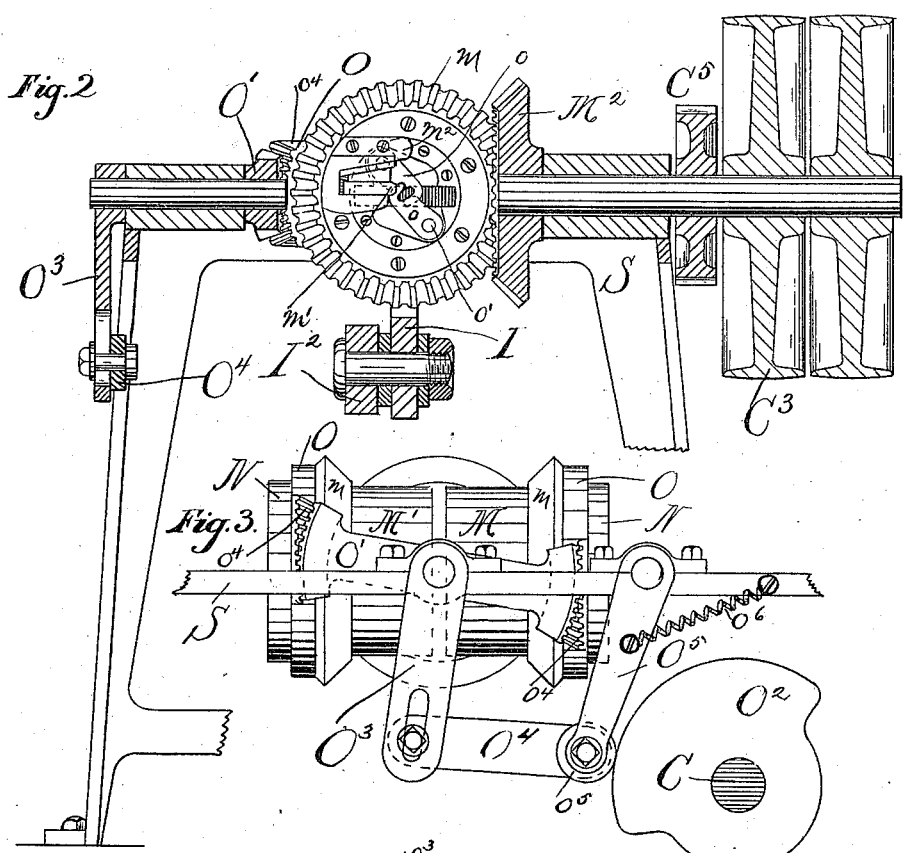

(Model.)
5 Sheets—Sheet 3.
F. P. CADY.
MACHINE FOR MAKING BARB LINK FENCING.
No. 292,408. Patented Jan. 22, 1884.
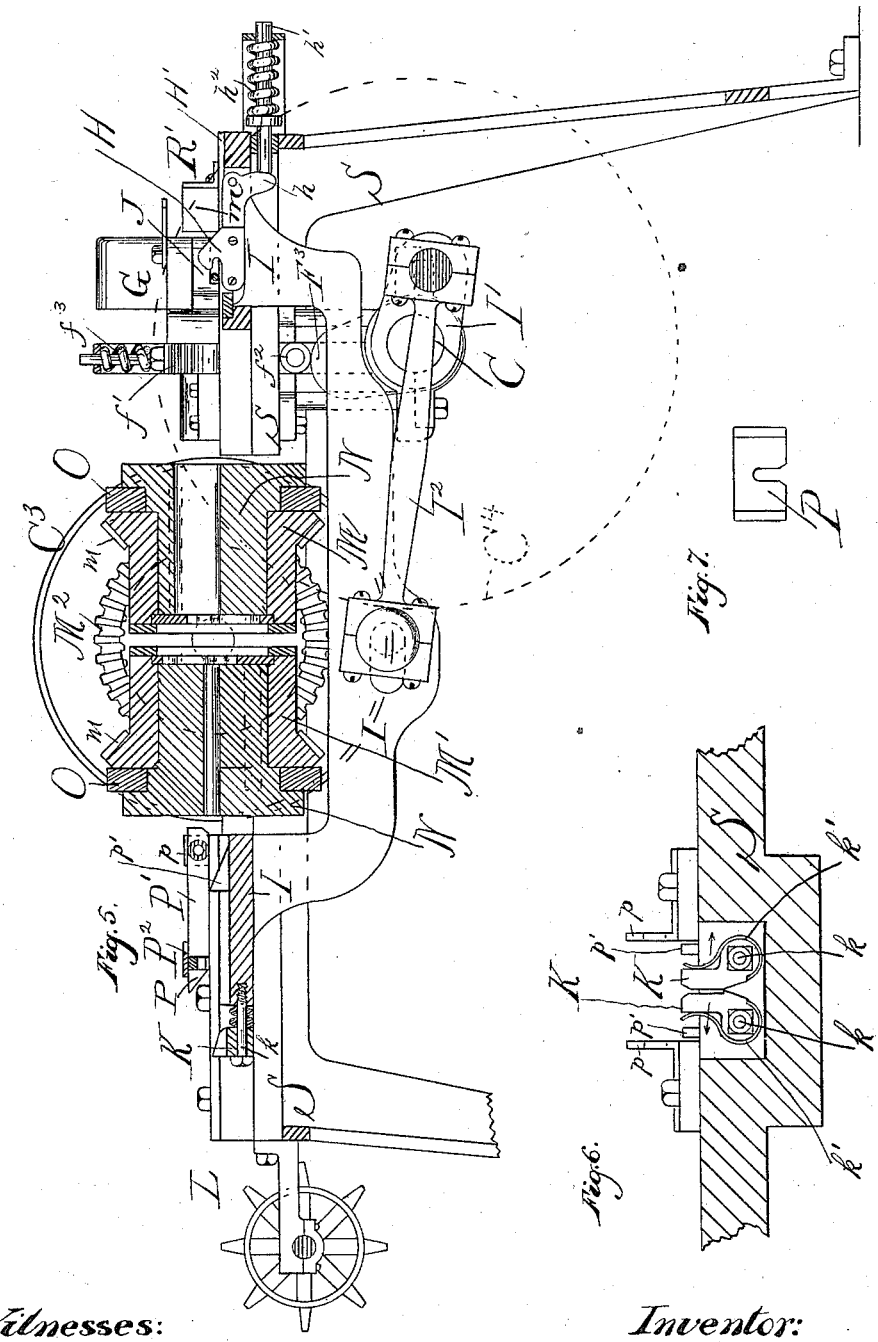
Witnesses:
T. Everett Brown
A. W. Munday.
Inventor:
Frank P. Cady
per Munday, Everts and Adcock
his Attorneys.
N. PETERS. Photo-Lithographer, Washington, D. C.

(Model.)
F. P. CADY.
MACHINE FOR MAKING BARB LINK FENCING.
No. 292,408. Patented Jan. 22, 1884.
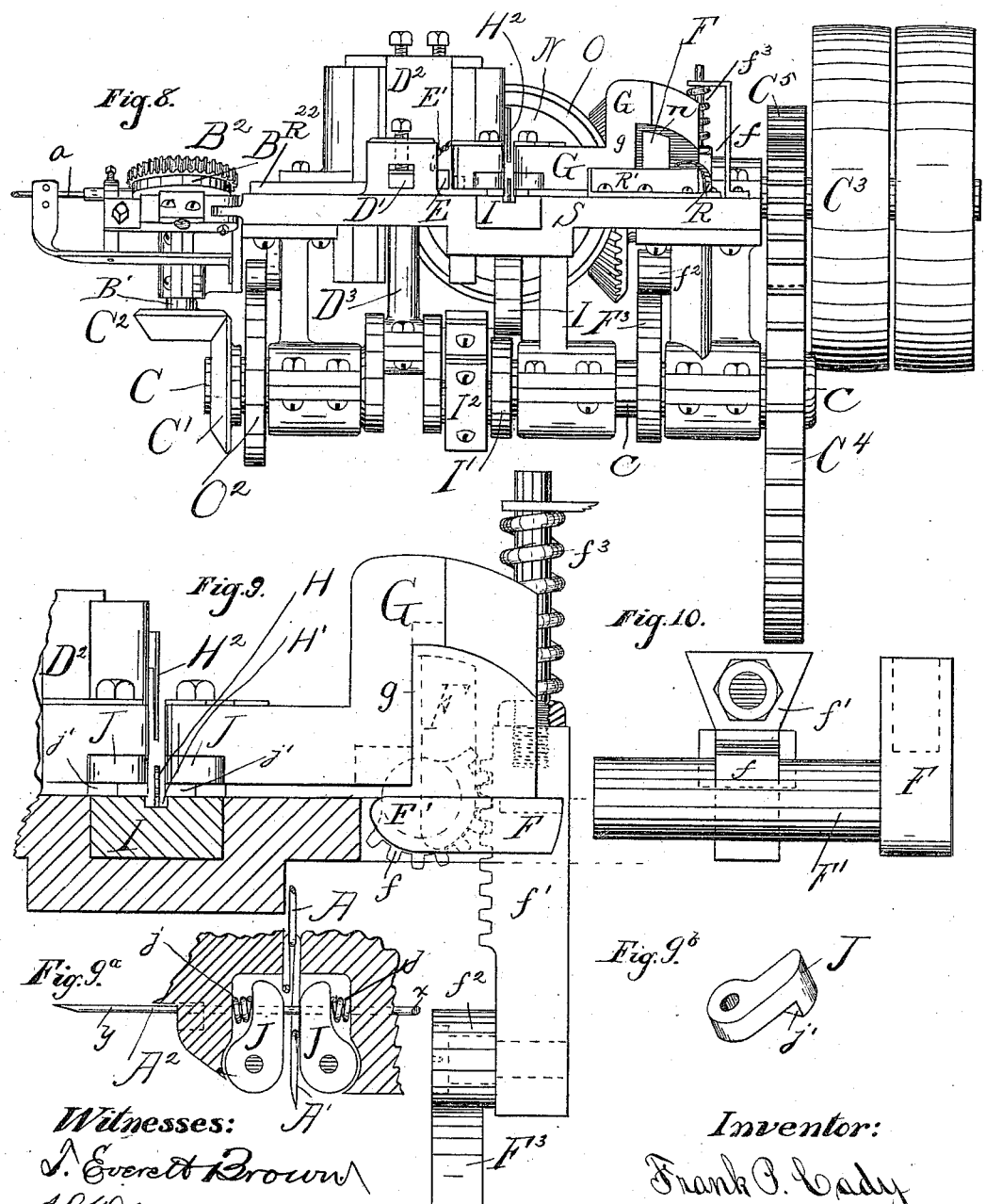
Witnesses:
J. Everett Brown
A. W. Munday
Inventor:
Frank P. Cady
per Munday, Evarts & Adcock
his Attorneys

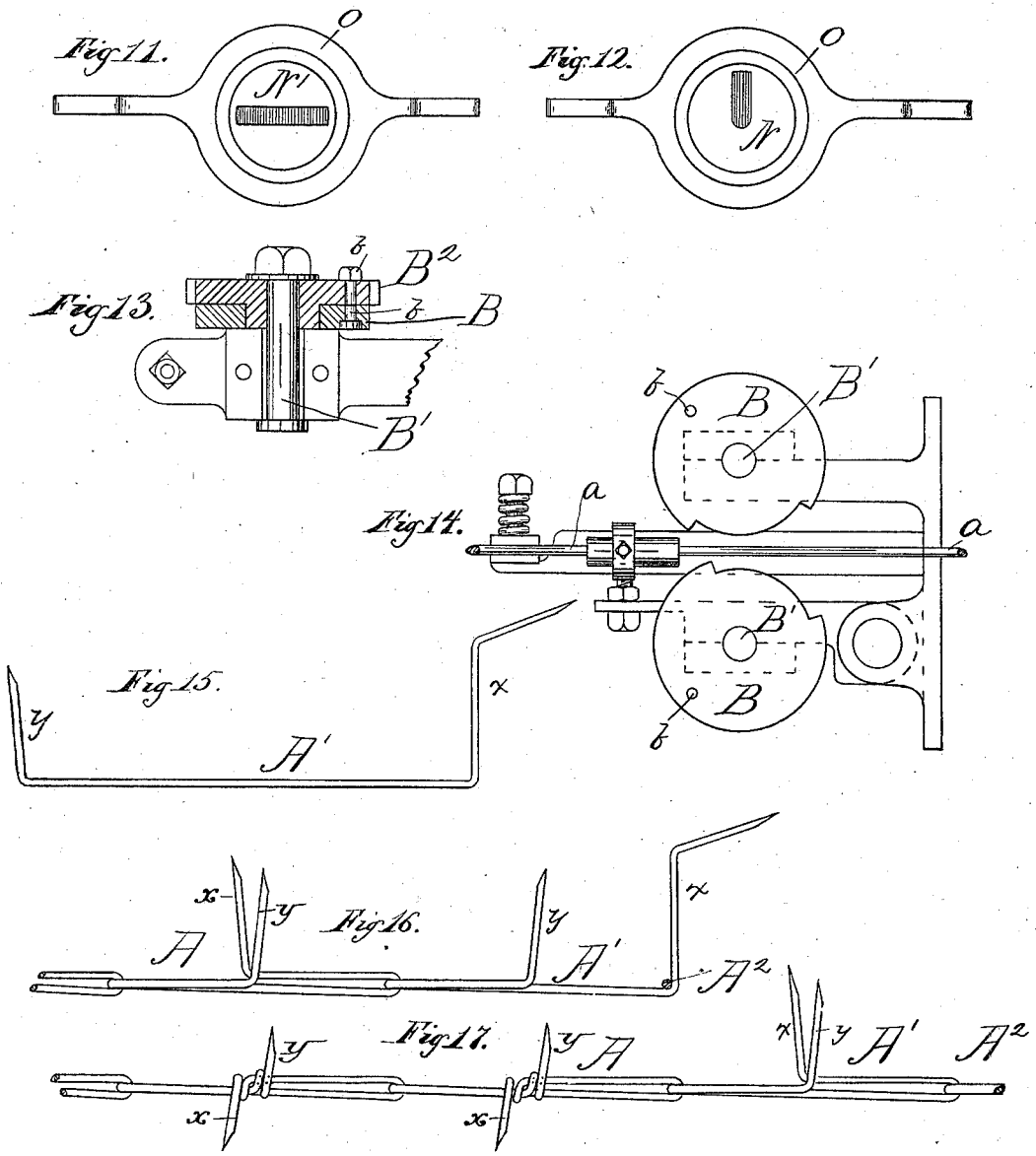

United States Patent Office.

FRANK P. CADY, OF CHICAGO, ILLINOIS, ASSIGNOR, BY MESNE ASSIGNMENTS, TO THE CAMBRIA IRON COMPANY, OF PENNSYLVANIA.

MACHINE FOR MAKING BARB-LINK FENCING.

SPECIFICATION forming part of Letters Patent No. 292,408, dated January 22, 1884.

Application filed July 18, 1883. (Model.)

*To all whom it may concern:*

Be it known that I, FRANK P. CADY, a citizen of the United States, residing in Chicago, in the county of Cook and State of Illinois, have invented a new and useful Improvement in Machines for Making Barb-Link Fencing, of which the following is a specification.

This invention relates to machines for making link or chain barb wire fencing automatically.

The nature of the invention will fully appear from the following description and the accompanying drawings, wherein—

Figure 1 is a plan view of the entire machine. Fig. 2 is a vertical transverse section upon the line 2 2 of Fig. 1. Figs. 3 and 4 are enlarged details of the mechanism for operating the clamping-jaws which seize the wire at each side of the coilers during the operation of the latter. Fig. 5 is a longitudinal vertical section of the machine upon the line 5 5 of Fig. 1. Fig. 6 is an enlarged vertical cross-section, showing the jaws whereby the cable is fed forward from the coilers. Fig. 7 is a detail of the bridge-piece. Fig. 8 is an elevation of the receiving end of the machine. Fig. 9 is a partial section enlarged, showing the devices for shaping the forward end of the link-blank at the first operation thereon. Fig. $9^a$ is an enlarged horizontal section, showing the yield-guides which co-operate with the hook in one of the bending operations. Fig. $9^b$ is a perspective of one of said guides. Fig. 10 is a detail of one of the benders. Figs. 11 and 12 are end views of the slotted mandrels bearing the coiling-heads, and through which the link passes, that in Fig. 12 being the one which receives the link before the ends are coiled, and that in Fig. 11 being the final one, the link traveling through it after the ends have been coiled. Fig. 13 is a detail section of one of the feeding-rolls, whereby the plain wire is fed at stated intervals and in proper lengths. Fig. 14 is a horizontal view, enlarged, of said rolls, the actuating-gearing being removed for the sake of clearness. Fig. 15 shows the link-blank as it is left by the first bending operations at each end. Fig. 16 shows one blank at the end of the second bending, and another blank, the next preceding one, at the end of the third bending operation. Fig. 17 shows the completed cable, and also a link at the end of the third bending, and in readiness for the coiling of the points.

For the sake of perspicuity in my description, I propose giving, as nearly as may be in the order in which they occur, the various operations performed upon each link of the cable in its passage through the machine, and, as it is necessary to mention at least three consecutive links, I distinguish the most advanced one by the letter A, the next in course by A′, and the last by $A^2$. The end of the link which first enters the machine is also distinguished as $x$, and the other end as $y$.

The fencing is formed from a single wire, $a$, which is fed to the machine by continuously-operated mutilated rolls B. The rolls are loosely mounted upon shafts B′ in juxtaposition to the gears $B^2$, and are adjustable within certain limits around their respective shafts by means of the tightening-screws $b$ and the circular slots $b'$ in said gears. If constructed as shown, these rolls will feed the longest lengths of the wire when their bearing-surfaces exactly coincide; but if it is designed to shorten the links, it may be done by adjusting one or the other of the rolls so that the bearing-surfaces will not bear upon the wire together until later, as illustrated at Fig. 14. This adjustability may be confined to one of the rolls, and it is not necessary that the rolls and gears be placed together upon the shaft so long as the former are adjustable. One of the shafts B′ is actuated from the main shaft C of the machine by gears C′ $C^2$, and said main shaft receives power from the drive-pulley $C^3$ through the meshing of gears $C^4$ and $C^5$. When the wire $a$ has been fed in the length necessary to form a link, such length is severed by the raising of the knife D, the stationary mate whereof is shown at D′, said moving part being carried by the head $D^2$, which is actuated from the main shaft by the crank $D^3$. A bending device, E, is carried by the same head with the knife, but is located the diameter of the wire below the surface of the knife, so the latter may complete the operation of severing before the bender commences its work. This work is the bending of the end $y$ of blank A′ upward to an angle nearly at right angles with the body of the blank, as shown at Fig. 15. The resistance necessary to effect this bend is afforded by a guide-plate, E', located over the wire, and having its vertical face, wherewith the point $y$ comes in contact as the bend proceeds, beveled off, as in Fig. 1, to give said end an inclination laterally oblique to the vertical. This last feature is more fully explained hereinafter. At the same time the end $x$ of the blank is carried up so as to stand nearly at right angles by a rising bending device, F, oscillated upon a pivot, F', by means of a pinion, $f$, upon said pivot, and a reciprocating rack, $f'$, engaging with said pinion and actuated by the contact of a cam, $F^3$, upon the main shaft, with the roller $f^2$ on the rack. A spring, $f^3$, returns the rack after it has been forced upward by the cam. The body of the blank adjacent to the part thus bent is held down during this operation by the guide-plate G. This bender F lies, when not in operation, below the line of the feed, as shown in Fig. 9, and partly under the stationary guide G, now to be described.

Before the completion of the bend last mentioned of the end $x$ the extremity of said end is caught by the overhanging part of the stationary guide G, and as that bend proceeds it holds said extremity down, so that by the time the bender F has reached the position shown in Fig. 8, and also in dotted lines in Fig. 9, a double bend will have been imparted to this end of the blank. At this time the blank has assumed the shape given in Fig. 15. The guide G not only overhangs the blank, but it presents a vertical face, $g$, between which and the bender F the wire is pressed into shape. Said overhanging portion is beveled off at its vertical side, as illustrated at $n$, so that as the point of the blank passes along such beveled portion the bent-up end $x$ may assume a plane slightly oblique and lateral to the true vertical. This is desirable, as it leaves the point in better position for the succeeding operations, and obviates the providing of holding devices for insuring the proper position of the bent-up ends of the blank. The guide E' is shaped to give this same peculiarity to the other point of the blank, and for the same reason.

The next operation in order is bending down the $x$ end of the preceding blank A, and this is done by the forwardly-projecting point of the pivoted reciprocating hook H, which is carried by a yoke-slide, I, having bearings at each end of the machine, and actuated by the crank I' and pitman I² from the main shaft. This bending down or doubling of the blank A causes it to inclose the blank A', inasmuch as said blank A', when first fed into the machine, is caused to pass over the blank A, and at the time of said bending lies in the angle of the blank A, just as the blank A² lies in the angle of the blank A' in Fig. 16.

In order to insure contact by the forward point of the hook with the vertical end of the blank A, I place at either side of said hook yielding guides J J, pivoted at their rear ends and pressed toward the line of motion of the hook at their forward ends by springs $j$, the purpose of the pivoting and spring features being to permit the guides to yield as the number of folds in the blank increase and require more room. The hook H continues its forward movement, and next engages with the blank A', and carries it forward in a line at right angles to the line in which it was first fed in. In so doing the blank is caused to double upon itself, because the hook in such continued movement enters the narrow passage-way J' between the guides J, which are furnished with downward projections $j'$ on their forward ends, forming the sides of said passage J'. Before this bend commences, however, the oscillating bender F, as well as the moving knife and bender E, have been returned to their normal positions below the plane of the feed. The blank A is now bent to the form of a link, as shown at the left of Fig. 16, with its points past each other, and lies in a plane at right angles to that in which it was first fed into the machine. It is allowed to remain in this position during the feeding in, cutting off, and upward bending of the ends of the next blank A², said blank A² having been fed over blank, A', so as to lodge in the angle thereof, as shown in said Fig. 16.

It should be noticed that when the hook begins its operation upon the blanks they sink from the level of the cross-feed, by which they enter the machine, to the bottom of the groove H' in the yoke-slide, such groove being the depth of the diameter of the wire. This allows the following blank to be fed over, as just stated. A guide, of thin metal, H², is placed over the hook H and in line therewith, the function whereof is the prevention of any tendency by the points to cross from one side of the link to the other, or, in other words, to rotate or twist past each other. The slide I, having completed its forward movement, immediately returns, and this return movement frees the hook H from the wire, and it is allowed to drop by its gravity below the level of the wire, and thereby avoid interference with the blank A² during its backward travel. As soon, however, as the hook has retracted to the rear of said blank A², it is forced upward again to the proper plane for its next operation by the contact of the arm or trip $h$, depending from its rear portion, with the spring-bolt $h'$, having a coiled spring, $h^2$, encircling it, and confined between a collar upon the bolt and the stationary bearing, in which one end of the bolt slides.

The next operation upon the blank A' is the bending down of its $x$ end by the hook H in the same manner that the end of the link A was bent down by said hook, as previously described, and a like continued forward motion of said hook ensues and doubles the blank A² in the same manner as the link A' has already been doubled. The links A and A' are now ready for the action of the coiling devices, and are moved toward the same intermittently by the feeding-jaws K, (assisted incidentally by said hook H,) as now to be described. As the links are now united, the forward feed from this time is caused by the jaws K, (shown in Fig. 6,) which are located beyond the coiling devices, and which automatically open to allow the barb-points to go by without injury and close again as soon as they are by. These jaws are beveled off at the top, are pivoted at $k$, and are under the influence of springs $k'$, so that they open easily to the barbs. As soon as the cable passes on its way to the spooler from these jaws to the sprocket-wheel L, which is located in a lower plane, the pull upon the cable tends to force it between these jaws, but it does not enter between the same far enough to cause entanglement with the projecting points of the cable. The jaws K are placed in the yoke-slide I, so that they are simultaneous in their movements with the hook H.

I now return to describe the coiling devices: The links pass into the coiling mechanism in the form shown at the right of Fig. 17. This coiling mechanism consists of two coiling-heads, each rotating upon a stationary longitudinally-slotted mandrel. The coiling-heads are alike, and are placed with their operating ends facing each other, are operated continuously, and each bends one of the link-points. I designate these coiling-heads by the letters M M'. They are actuated in opposite directions by a gear, M², upon the same shaft with the drive-pulley, meshing with toothed rims $m$ upon the heads. The mandrel which first receives the links is marked N, and is slotted vertically above its center, as shown in Fig. 12. This location of slot is required because the points stand upward during their passage through this mandrel. The other mandrel, N', is slotted horizontally at both sides of the center, because after the coiling the points stand out laterally from opposite sides. Each coiling-head carries a coiling-point, $m'$, and also a guide, $m^2$, located toward the periphery, and calculated to catch the outer extremity of the barb-point, and to hold it so that it will not slip off the coiler-point. To prevent torsion of the link and insure good work by the coilers, I provide clamping devices in each mandrel, which seize the link in close proximity to the point of coiling at either side thereof. These clamps consist of opposing hooks $o$, which are mounted upon shafts $o'$, passing longitudinally through the mandrels, and having upon their outer ends arms $o^2$, which are engaged by recesses $o^3$ in the rings O, encircling the mandrels. These rings are loose upon the mandrels, and are provided with cogged segments $o^4$, and are oscillated by the meshing with said segments of the toothed ends of the rocking lever O', said lever being actuated from the cam O² upon the main shaft by the intermediate levers, O³ O⁴ O⁵ and anti-friction-roller $o^5$. A retracting-spring, $o^6$, is employed to return the levers after the cam has moved them. It results from the construction of these parts that the oscillation of the ring rocks the shafts upon which the hooks are mounted, so that said hooks move toward and from the link at proper intervals. The cam is so timed as to cause said hooks to clamp the link just before the coiling operation begins, and to release it as soon as the coiling is done. By slotting the lever O⁵ as shown at Fig. 3 the amount of movement given to the clamping-hooks is permitted to be increased or diminished, as desired, by changing the point of attachment of the lever O⁴. As soon as the clamps release the link, the latter drops a short distance to free the points from the coilers, and a forward impulse of the yoke-slide carries the cable along the length of the link.

An intermittently-acting stop device engaging with the cable between the forward movements thereof is preferably employed, and it may consist of a bridge-piece, P, notched, as shown in Fig. 7; to allow it to sit down astride the cable, but not so as to permit the passage through it in either direction of the barb-points. This bridge-piece is carried upon the forward portions of two longitudinal pieces, P', which are pivoted to stationary uprights $p$. As will be noticed, said pieces P' are beveled upon their forward ends, and the yoke-slide I carries an inclined projection, $p'$. With this construction it follows that when the slide I is moved forward the projection $p'$ passes beyond the pieces P', and allows them to fall with the bridge-piece astride the cable, and when said slide retreats the contact of the beveled ends thereof with the projections $p'$ raises them and the bridge-piece from the cable and sustains them in that position until the next forward movement of the slide I. The bridge-piece acts as a stop by reason of the contact therewith of the barb-points and coiled portions of the link. A spring, P², is employed to insure the depression of the bridge-piece at the proper times. The feed-rolls by which the wire is first delivered I place upon an incline, in order to bring them to the proper position relative to the other parts of the machine. I sometimes employ guides R and R' upon the bed of the machine, which serve to deflect the point of the incoming blank, if such point becomes bent or does not present itself in proper position. The bed and frame of the machine I have designated by the letter S.

It will be seen from what has been given that the $x$ half of the blank is first partially bent into form by the bender F acting in conjunction with the guide G, and completed by the forward projection upon the reciprocating hook H, and that the $y$ half is first partially formed by the bender E and guide E' and completed by the continued forward impulse of said hook in conjunction with the resistance afforded by the guides J.

The change in the direction of the feed which occurs during the passage of the blank through the machine, I have stated to be at right angles. This, however, while it may be preferable, need not necessarily be a change at right angles, because almost any angle wherein the lines of the feed cross each other and permit one blank to be fed across the other may be used.

The parts of the machine which come in contact with the wire may be formed of chilled metal, and in some instances these chilled portions are indicated by dotted lines.

The wire is preferably passed under a plate, B², between the feed-rolls and the knives, unless those parts are close together.

I claim—

1. In a link-fence machine, the combination of the feeding and severing mechanisms with bending devices for bending the ends of the blank to form the barbs and for forming the link, substantially as specified.

2. In a barb-fence machine, the combination of wire feeding and severing devices and blank-bending devices, substantially such as described, with devices for coiling the ends of the link, essentially as set forth.

3. In a barb-fence machine, the combination of wire feeding and severing devices and blank-bending devices with devices for coiling the ends of the link and devices for clamping the link at each side of the coiling devices, substantially as specified.

4. In a barb-fence machine, the combination of two coiling-heads revolving in different directions, in combination with mandrels supporting the same and slotted longitudinally to permit the passage of the outstanding link-points, substantially as specified.

5. In a barb-fence machine, the combination, with coiling devices, of the clamping devices for holding the link at each side of the coiling-point, substantially as specified.

6. The combination, with the coiling devices, of feeding devices engaging with the cable at the rear of said coilers, and other feeding devices engaging with the cable in front of said coilers, said feeding devices being connected together so as to move unitedly, substantially as specified.

7. The combination, in a barb-chain-cable machine, of a feed device in advance of the coiling devices, the hook H, in the rear of the coiling devices, and the yoke-slide carrying both the feed device and the hook, substantially as specified.

8. In a barb-fence machine, the combination of devices for feeding and severing the wire and for bending the ends of the blank with a bending device moving at right angles to the line of the blank, substantially as specified.

9. In a machine for making link-fence, the combination of the following instrumentalities, viz: wire-feeding devices, wire-severing devices, benders for bending both ends of the severed blank, guides or holders for holding the blank while said benders are operating, a bending device moving at right angles to said feeding devices, and guides at the side of the line of motion of the last-mentioned bender, substantially as specified.

10. The combination of wire-feeding devices, a support for the wire, a feeding device moving at right angles to the line of said first-mentioned feed devices, and a groove in said support under and in line with said last-mentioned feeding device, whereby the incoming wire is caused to pass over the link already partly formed, substantially as specified.

11. The combination of the moving bender F, the guide and plate G, and the reciprocating hook H, whereby one-half of the blank is bent into form ready for coiling, substantially as specified.

12. The combination of the moving bender E, the guide E', the reciprocating hook H, and resisting-points at each side of said hook, whereby one of the halves of the link is shaped ready for the coiling, substantially as specified.

13. In a machine for making link-fence, the combination of moving benders E and F with guides E' and G, substantially as specified.

14. The reciprocating hook H, in combination with the yielding guides J J, substantially as set forth.

15. In a barb-fence machine, the guide C, having the beveled overhanging vertical surface, in combination with the moving bender F, substantially as specified.

16. The guide G, constructed, as shown, to impart a double bend to the link, in combination with a moving bender, substantially as shown.

17. In a barb-fence machine, the combination, with the spooler and mechanism for feeding the cable thereto, of an intermittently acting stop engaging with the cable, substantially as specified.

18. The combination, with the clamping-hooks at the sides of the coiling-point, of the adjustable lever and the intervening devices, whereby the amount of throw of said hooks is permitted to be regulated, substantially as specified.

19. In a barb-chain-cable machine, the combination, with the hook H, reciprocating and pivoted as specified, of a trip device for raising said hook at the end of its return movement, substantially as and for the purpose set forth.

20. In a machine for making link-fencing, the combination, with the devices for bending the blank into link shape for coiling, and the coiling devices, of the guide H², for keeping the points of the link from crossing, substantially as specified.

FRANK P. CADY.

Witnesses:
T. EVERETT BROWN,
H. M. MUNDAY.